United States Patent
Coke et al.

(10) Patent No.: US 8,402,252 B2
(45) Date of Patent: *Mar. 19, 2013

(54) DETERMINING LENGTH OF INSTRUCTION WITH ADDRESS FORM FIELD EXCLUSIVE OF EVALUATING INSTRUCTION SPECIFIC OPCODE IN THREE BYTE ESCAPE OPCODE

(75) Inventors: James S. Coke, Shingle Springs, CA (US); Peter J. Ruscito, Folsom, CA (US); Masood Tahir, Orangevale, CA (US); David B. Jackson, Foslom, CA (US); Ves A. Naydenov, Foslom, CA (US); Scott D. Rodgers, Hillsboro, OR (US); Bret L. Toll, Hillsboro, OR (US); Frank Binns, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,241

(22) Filed: Mar. 10, 2012

(65) Prior Publication Data

US 2012/0173852 A1    Jul. 5, 2012

Related U.S. Application Data

(63) Continuation of application No. 13/070,908, filed on Mar. 24, 2011, now Pat. No. 8,161,269, which is a continuation of application No. 12/039,719, filed on Feb. 28, 2008, now Pat. No. 7,966,476, and a continuation of application No. 10/611,164, filed on Jun. 30, 2003, now Pat. No. 7,917,734, said application No. 12/039,719 is a continuation of application No. 10/611,164.

(51) Int. Cl.
*G06F 9/30* (2006.01)

(52) U.S. Cl. ........................................ 712/210; 712/213

(58) Field of Classification Search ........................ None
See application file for complete search history.

(56) References Cited

U.S. PATENT DOCUMENTS

| 3,657,705 A | 4/1972 | Mekota, Jr. et al. |
| 4,200,927 A | 4/1980 | Hughes et al. |
| 4,591,972 A | 5/1986 | Guyer et al. |
| 4,873,629 A | 10/1989 | Harris et al. |
| 5,353,420 A | 10/1994 | Zaidi |
| 5,438,668 A * | 8/1995 | Coon et al. .................... 712/204 |
| 5,535,347 A | 7/1996 | Growchowski et al. |

(Continued)

FOREIGN PATENT DOCUMENTS

| JP | 03-053325 | 3/1991 |
| JP | 10-091430 | 4/1998 |

(Continued)

OTHER PUBLICATIONS

Xerox Corporation, "Mesa Processor Principles of Operation", Version 4.0, pp. 1-8, May 1984.*

(Continued)

*Primary Examiner* — Kenneth Kim
(74) *Attorney, Agent, or Firm* — Mnemoglyphics, LLC; Lawrence M. Mennemeier

(57) ABSTRACT

A method, apparatus and system are disclosed for decoding an instruction in a variable-length instruction set. The instruction is one of a set of new types of instructions that uses a new escape code value, which is two bytes in length, to indicate that a third opcode byte includes the instruction-specific opcode for a new instruction. The new instructions are defined such the length of each instruction in the opcode map for one of the new escape opcode values may be determined using the same set of inputs, where each of the inputs is relevant to determining the length of each instruction in the new opcode map. For at least one embodiment, the length of one of the new instructions is determined without evaluating the instruction-specific opcode.

19 Claims, 7 Drawing Sheets

U.S. PATENT DOCUMENTS

| | | | |
|---|---|---|---|
| 5,537,629 A | 7/1996 | Brown et al. | |
| 5,572,206 A | 11/1996 | Miller et al. | |
| 5,586,277 A | 12/1996 | Brown et al. | |
| 5,592,635 A * | 1/1997 | Chan | 712/210 |
| 5,600,806 A | 2/1997 | Brown et al. | |
| 5,619,666 A | 4/1997 | Coon et al. | |
| 5,630,083 A | 5/1997 | Carbine et al. | |
| 5,694,589 A | 12/1997 | Glew et al. | |
| 5,721,855 A | 2/1998 | Hinton et al. | |
| 5,740,392 A | 4/1998 | Brennan | |
| 5,758,116 A | 5/1998 | Lee et al. | |
| 5,778,246 A | 7/1998 | Brennan | |
| 5,809,272 A | 9/1998 | Thusoo et al. | |
| 5,822,555 A | 10/1998 | Brown et al. | |
| 5,822,559 A | 10/1998 | Narayan et al. | |
| 5,845,099 A | 12/1998 | Krishnamurthy et al. | |
| 5,845,102 A | 12/1998 | Miller et al. | |
| 5,859,994 A | 1/1999 | Zaidi | |
| 5,931,944 A | 8/1999 | Ginosar et al. | |
| 5,941,982 A | 8/1999 | Ginosar et al. | |
| 5,948,096 A | 9/1999 | Ginosar et al. | |
| 5,978,899 A | 11/1999 | Ginosar et al. | |
| 6,014,735 A * | 1/2000 | Chennupaty et al. | 712/210 |
| 6,032,250 A | 2/2000 | Zaidi | |
| 6,260,134 B1 | 7/2001 | Zuraski et al. | |
| 6,301,650 B1 * | 10/2001 | Satou | 712/35 |
| 6,317,822 B1 | 11/2001 | Padwekar | |
| 6,496,923 B1 | 12/2002 | Grunner et al. | |
| 6,684,322 B1 | 1/2004 | Grunner et al. | |
| 7,213,129 B1 | 5/2007 | Grunner et al. | |
| 7,305,542 B2 * | 12/2007 | Madduri | 712/204 |
| 7,640,417 B2 | 12/2009 | Madduri | |
| 2003/0154359 A1 | 8/2003 | Henry et al. | |
| 2004/0268090 A1 | 12/2004 | Coke et al. | |

FOREIGN PATENT DOCUMENTS

| | | |
|---|---|---|
| JP | 2004-038521 | 6/2002 |
| JP | 2002-163104 | 2/2004 |
| RU | 2109333 | 4/1998 |
| WO | WO 93/20507 | 10/1993 |
| WO | WO 97/16785 | 5/1997 |
| WO | WO 97/22922 | 6/1997 |

OTHER PUBLICATIONS

Mesa Processor Principles of Operation, Version 4.0, Xerox Corporation, May 1984, pp. 1-8 [www.digibarn.com/friends/alanfreier/princops/04xInstructionInterpreter.html].

AMD, "3DNOW! Technology Manual," Mar. 2000, 72 pages.

"VIS Instruction Set User's Manual," Sun Microsystems, May 2001, pp. 1-8.

"Intel Architecture Software Developer's Manual, vol. 2"[Online], Intel, XP00243745, URL:ftp://download.intel.com/design/PentiumII/manuals/24319102.PDF, 1999.

Case, "3DNoW Boosts Non-Intel 3D Performance," Jun. 1, 1998, Microdesign Resources, XP002434746.

Pan et al., "Heads and Tails: A Variable-Length Insruction Format Supporting Parallel Fetch and Deconde" [Online], Nov. 17, 2001, ACM, Atlanta, Georgia, XP002434747, URL:http://www.cag.csail.mit.edu/scale/papers/hat-cases2001.pdf.

* cited by examiner

DETERMINING LENGTH OF INSTRUCTION WITH ADDRESS FORM FIELD EXCLUSIVE OF EVALUATING INSTRUCTION SPECIFIC OPCODE IN THREE BYTE ESCAPE OPCODE

RELATED APPLICATIONS

This is a continuation application claiming the benefit under 35 USC 120 of application Ser. No. 13/070,908, filed Mar. 24, 2011, now U.S. Pat. No. 8,161,269, which is a continuation of application Ser. No. 10/611,164, filed Jun. 30, 2003, now U.S. Pat. No. 7,917,734 and of application Ser. No. 12/039,719, filed Feb. 28, 2008, now U.S. Pat. No. 7,966,476, which is also a continuation of application Ser. No. 10/611, 164, filed Jun. 30, 2003, now U.S. Pat. No. 7,917,734.

FIELD OF THE DISCLOSURE

This invention relates to microprocessor systems. In particular, the invention relates to instruction set extension using 3-byte escape opcode values in an opcode field.

BACKGROUND OF THE DISCLOSURE

Description of Related Art

Microprocessor technology has evolved over the years at a fast rate. Advances in computer architecture and semiconductor technology have created many opportunities to design new processors. There are typically two options for designing new processors: (1) defining a completely new architecture, and (2) extending the current architecture to accommodate new features. Each option has both advantages and disadvantages. However, when a processor has captured a significant market segment, option (2) offers many attractive advantages. The main advantage of extending the current architecture is the compatibility with current and earlier models. The disadvantages include the problems of getting out of the constraints imposed by the earlier designs.

New processors involve new features in both hardware and software. A new processor based on existing design typically has an additional set of instructions that can take advantage of the new hardware design. However, extending an instruction set by adding a new set of instructions is a challenging problem because of the constraints in the encoding of the instructions. Therefore there is a need in the technology to provide an efficient method for extending an instruction set without increasing hardware complexity.

BRIEF DESCRIPTION OF THE DRAWINGS

The features and advantages of the invention will become apparent from the following detailed description of the invention in which.

DETAILED DESCRIPTION

Embodiments of a method, apparatus and system for extending an instruction set using three-byte escape opcodes are disclosed. Disclosed embodiments further provide for extending an instruction set that uses three-byte escape opcodes by using a prefix to qualify an instruction that includes a three-byte escape opcode. Disclosed methods use a set of existing instruction fields to define a new set of instructions and provide an efficient mechanism to decode the new instruction set.

As used herein, the term "three-byte escape opcode" refers to a two-byte value that indicates to decoder logic that the opcode for the instruction of interest includes three bytes: the two bytes of the three-byte escape opcode plus a one-byte instruction-specific opcode. For at least one embodiment, the two-byte value in the three-byte escape opcode field is one of the following values: 0x0F38, 0x0F39, 0x0F3A or 0x0F3B.

In the following description, for purposes of explanation, numerous specific details such as processor types, instruction formats, logic gate types, and escape opcode values are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. In the following description, the notation 0x indicates the number that follows is in hexadecimal format.

Figure 1:
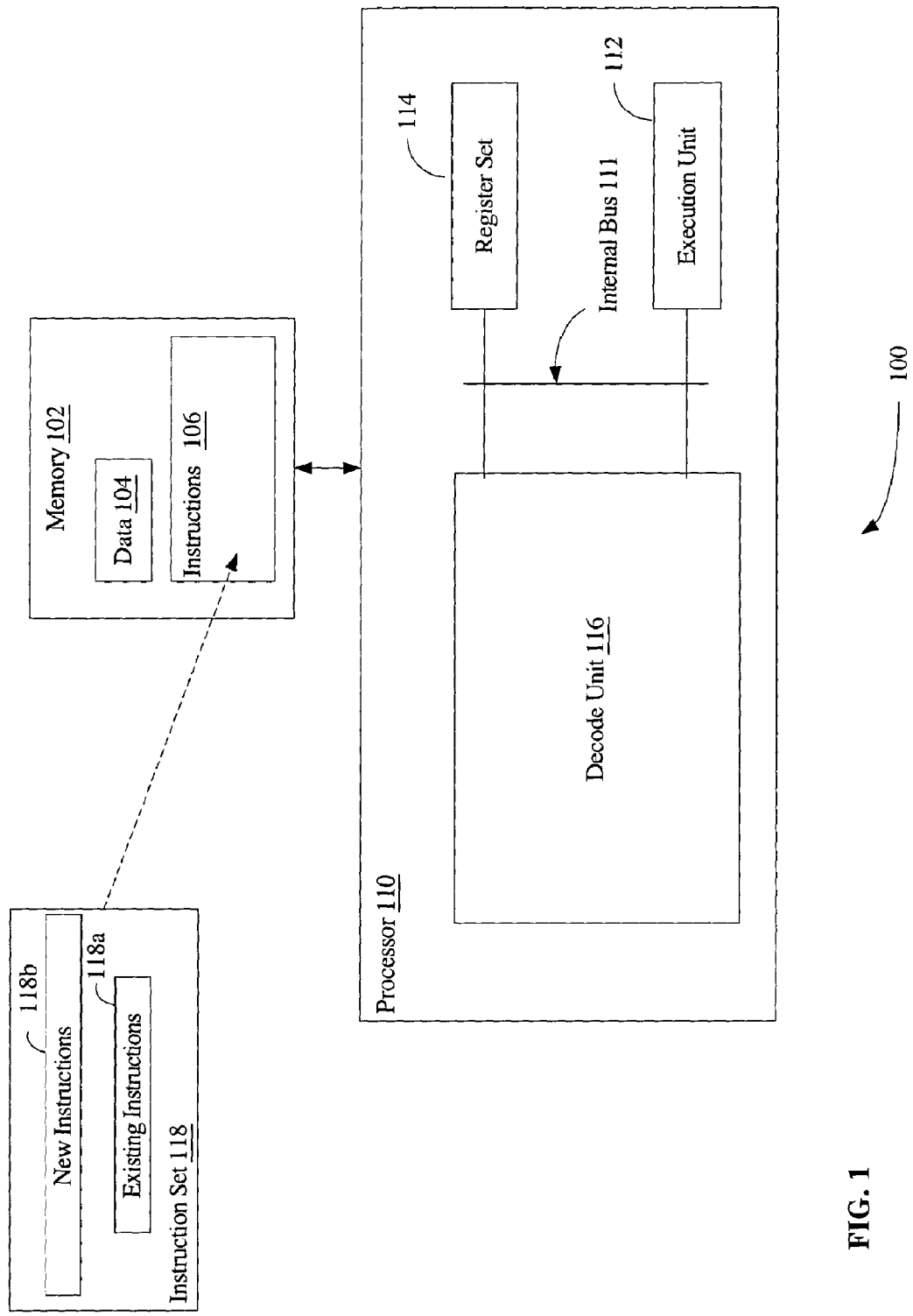
FIG. 1 is a block diagram illustrating at least one embodiment of a processing system that may utilize disclosed techniques.

Reference to FIG. 1 illustrates at least one embodiment of a processing system 100 that may utilize disclosed techniques. System 100 may be used, for example, to decode and execute new type 0 instructions and new type 1 instructions. For purposes of this disclosure, a processing system includes any system that has a processor 110, such as, for example; a digital signal processor (DSP), a microcontroller, an application specific integrated circuit (ASIC), or a microprocessor. The processor 110 may be of any type of architecture, such as complex instruction set computers (CISC), reduced instruction set computers (RISC), very long instruction word (VLIW), multi-threaded or hybrid architecture. System 100 is representative of processing systems based on the Itanium® and Itanium® II microprocessors as well as the Pentium®, Pentium® Pro, Pentium® II, Pentium® III, Pentium® 4 microprocessor, all of which are available from Intel Corporation. Other systems (including personal computers (PCs) having other microprocessors, engineering workstations, personal digital assistants and other hand-held devices, set-top boxes and the like) may also be used. In one embodiment, system 100 may be executing a version of the Windows™ operating system available from Microsoft Corporation, although other operating systems and graphical user interfaces, for example, may also be used.

FIG. 1 illustrates that the processor 110 includes a decode unit 116, a set of registers 114, at least one execution unit 112, and at least one internal bus 111 for executing instructions. Of course, the processor 110 contains additional circuitry, which is not necessary to understanding the invention. The decode unit 116, registers 114 and execution unit 112 are coupled together by one or more internal bus 111. The decode unit 116 is used for decoding instructions received by processor 110 into control signals and/or microcode entry points. The instructions may be issued to the decode unit 116 by an instruction buffer (such as, e.g., 310 in FIG. 3). In response to these control signals and/or microcode entry points, the execution unit 112 performs the appropriate operations. The decode unit 116 may be implemented using any number of different mechanisms (e.g., a look-up table, a hardware implementation, a programmable logic array ("PLA"), etc.).

The decode unit 116 is shown to be capable of decoding instructions 106 that follow formats defined by an extended instruction set 118. The instruction set 118 includes an existing instruction set 118*a* and a new instruction set 118*b*. The instruction set 118 includes instructions for performing operations on scalar and packed data. The number format for these operations can be any convenient format, including single-precision, double-precision, and extended floating-point numbers, signed and unsigned integers, and non-numeric data. For at least one embodiment, the instructions defined in the instruction set 118 may vary in length from one another.

Instructions 106, which follow the formats set forth by the instruction set 118, may be stored in a memory system 102. Memory system 102 is intended as a generalized representation of memory or memory hierarchies and may include a variety of forms of memory, such as a hard drive, CD-ROM, random access memory (RAM), dynamic random access memory (DRAM), static random access memory (SRAM), flash memory and related circuitry. Memory system 102 may store, in addition to instructions 106, data 104 represented by data signals that may be executed by processor 110.

Instruction Format

Figure 2:
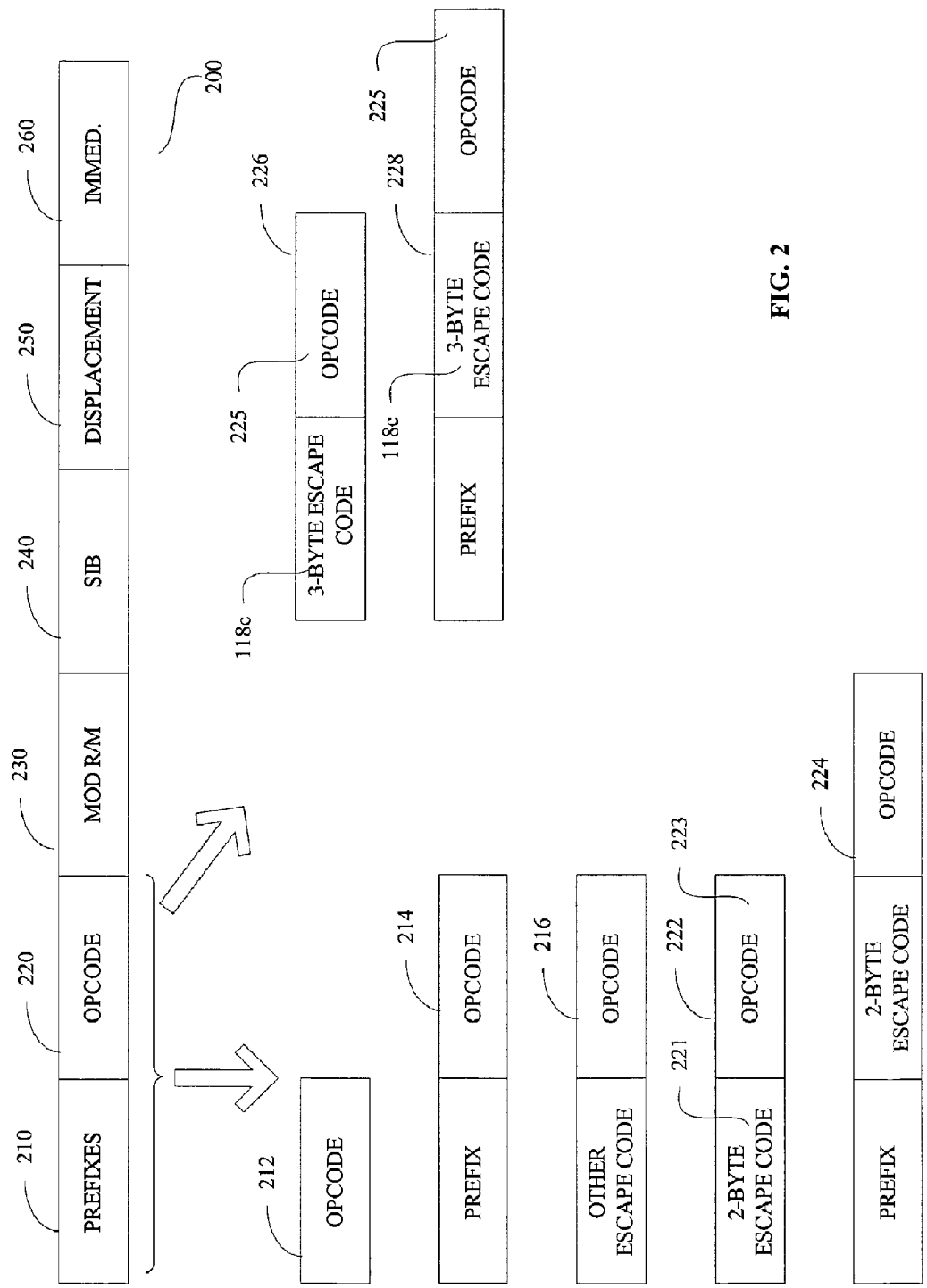
FIG. 2 is a block diagram illustrating at least one embodiment of a format for an instruction.

FIG. 2 is a diagram illustrating a format of an instruction 200 according to one embodiment of the invention. The instruction format 200 includes a prefix field 210, an opcode field 220, and operand specifier fields (e.g., modR/M, scale-index-base, displacement, immediate, etc.). The operand specifier fields are optional and include a modR/M field 230, an SIB field 240, a displacement field 250, and an immediate field 260.

The contents of the modR/M field 230 indicate an addressing-form. The modR/M field may specify registers and addressing modes.

Certain encodings of information in the modR/M field 230 may indicate that a second byte of addressing information is present in the SIB (Scale/Index/Base) field 240 to fully specify the addressing form of the instruction code. For instance, a base-plus-index addressing form and a scale-plus-index addressing form may each include information, such as scale factor, register number for the index, and/or register number of the base register, in the SIB field 240.

One skilled in the art will recognize that the format 200 set forth in FIG. 2 is illustrative, and that other organizations of data within an instruction code may be utilized with disclosed embodiments. For example, the fields 210, 220, 230, 240, 250, 260 need not be organized in the order shown, but may be re-organized into other locations with respect to each other and need not be contiguous. Also, the field lengths discussed herein should not be taken to be limiting. A field discussed as being a particular member of bytes may, in alternative embodiments, be implemented as a larger or smaller field. Also, the term "byte," while used herein to refer to an eight-bit grouping, may in other embodiments be implemented as a grouping of any other size, including 4 bits, 16 bits, and 32 bits.

As used herein, an instruction (such as one of the instructions 106 illustrated in FIG. 1) includes certain values in the fields of the instruction format 200 shown in FIG. 2. Such an instruction is sometimes referred to as "an actual instruction." The bit values for an actual instruction are sometimes referred to collectively herein as an "instruction code."

The acceptable byte values for an actual instruction are specified in the instruction set 118 (FIG. 1). Acceptable byte values for each of the fields of the instruction format 200 are those values that decode logic, such as instruction length decoder 306 (FIG. 3) and decode unit 116 (FIG. 1), recognize and operate upon to generate decoded instruction code. For each instruction code, the corresponding decoded instruction code uniquely represents an operation to be performed by the execution unit 112 (FIG. 1) responsive to the instruction code. The decoded instruction code may include one or more micro-operations.

The prefix field 210 illustrated in FIG. 2 may include a number of prefixes. In one embodiment, the prefix field 210 includes up to four prefixes, with each prefix being one byte. The prefix field 210 is optional. For the extended new instruction set discussed herein, the prefix field is used to extend the three-byte escape opcode instruction space.

The contents of the opcode field 220 specify the operation. For at least one embodiment, as is stated above, the opcode field for the new instruction set 118*b* discussed herein is three bytes in length. For at least one embodiment, the opcode field 220 for the extended new instruction set 118 thus may include one, two or three bytes of information. For some of the new instructions in the extended new instruction set discussed herein (type 0 instructions), the three-byte escape opcode value in the two-byte field 118*c* of the opcode field 220 is combined with the contents of a third byte 225 of the opcode field 220 to specify an operation. This third byte 225 is referenced to herein as an instruction-specific opcode. For others of the new instructions in the extended new instruction set discussed herein (type 1 instructions), the three-byte escape opcode value in the two-byte field 118*c* of the opcode field 220 is combined with the contents of the prefix field 210 and the contents of the instruction-specific opcode field 225 of the opcode field 220 to specify an operation.

In general, the combination of the prefix field 210 and the opcode field 220 creates a number of different types of instructions. For illustrative purposes, FIG. 2 shows only seven types of instructions: a regular one-byte instruction 212, a regular instruction with prefix as qualifier 214, a regular escape instruction 216, a first extended instruction type 222, a second extended instruction type 224, a first new instruction type 226 and a second new instruction type 228. As is known by one skilled in the art, other types of instruction can be similarly defined.

The regular one-byte instruction 212 includes regular instructions with one-byte instruction-specific opcodes in the opcode field 220. The regular instruction with prefix as qualifier 214 includes regular instructions that use the prefix as a qualifier for the opcode. For example, a string instruction may use a REPEAT prefix value to repeat the string instruction by a number of times specified in the count register or until a certain condition is met. The prefix value used in instruction 214 does not add a completely new meaning to the opcode value that follows in the opcode field 220. Rather, the prefix value is merely used as a qualifier to qualify the opcode with additional conditions. As will be explained later, this use of the prefix in the instruction 214 is markedly different from that in the second extended instruction type 224 and the second new instruction type 228.

The regular escape instruction 216 is a regular instruction that utilizes an escape opcode in a first field 215 of the opcode field 220 to indicate to decoder hardware that an instruction-specific opcode in a second field 217 of the opcode field 220 is used to define the instruction. For example, in one embodiment, a floating-point coprocessor escape opcode value 0xD8 through 0xDF in the first byte 215 of the opcode field 220 indicates that the opcode value that follows in the second byte 217 of the opcode field 220 should be interpreted as a coprocessor instruction and should be directed to coprocessor hardware for execution.

The first extended instruction type 222 is a particular type of escape instruction that is defined to contain a predefined escape opcode value, 0x0F, in a first field 221 of the opcode field 220. The escape opcode 0x0F indicates to decoder hardware that an instruction-specific opcode value in a second field 223 of the opcode field 220 is used to define the instruction. Instructions of the first extended instruction type 222 may, depending on the value of the second opcode byte (and, in some cases, the value of three bits of the modR/M field 230), be of varying lengths. For example, two instructions (Packed Shift Left Logical) of extended instruction type 222 may include the following instruction field values, respectively:

PSLLW (shift value in register): 0F:F1:1b"11xxxyyy", where xxx defines a first register and yyy defines a second register PSLLW (shift by immed. value): 0F:71:1b"11110xxx": immed data (8 bits), where xxx defines a register In each of the PSSLW instructions set forth, the first word of the opcode field 220 includes the escape value 0x0F. The first instruction is three bytes long but the second instruction is four bytes because it includes a byte of immediate data. Accordingly, for extended instruction type 222 decoder hardware (such as, for example, instruction length decoder 306 in FIG. 3) utilizes the escape opcode value 0x0F in the first field 221 of the opcode field 220 as well as the value in the second byte 223 of the two-byte opcode field 220 and the value of modR/M field 230 to decode the length of the instruction.

The first new instruction type 226 (also referred to as "new instruction type 0") is a new instruction type that is part of the new instruction set 118b (FIG. 1) to be added to the existing regular instruction set 118a (FIG. 1). The instruction format of the new instruction set 118b includes a 3-byte escape opcode field 118c and an instruction-specific opcode field 225. The 3-byte escape opcode field 118c is, for at least one embodiment, two bytes in length. The new instruction type 0 uses one of four special escape opcodes, called three-byte escape opcodes. The three-byte escape opcodes are two bytes in length, and they indicate to decoder hardware that the instruction utilizes a third byte in the opcode field 220 to define the instruction. The 3-byte escape opcode field 118c may lie anywhere within the instruction opcode and need not necessarily be the highest-order or lowest-order field within the instruction.

For at least one embodiment, the four new three-byte escape opcode values are defined as 0x0F3y, where y is 0x8, 0x9, 0xA or 0xB. For the instruction 226, the value in the instruction-specific opcode field 225 of the opcode field 220 should be decoded as a new instruction.

Examples of Instruction Prefixes and Escape Opcodes

Both second extended instruction type 224 and second new instruction type 228 (sometimes referred to herein as "new instruction type 1") use the value in the prefix 210 as part of the opcode. Unlike the regular instruction with prefix qualifier, 214 where the prefix merely qualifies the opcode that follows, the second extended instruction type 224 and new instruction type 1 228 both use the prefix to define a completely new instruction.

Instruction prefixes were originally developed to enhance a set of instructions. For example, the repeat prefix is developed to repeat a string instruction. The repeat prefix codes are 0xF3 (REP, REPE) and 0xF2 (REPNE). The prefix used as such does not define a new meaning for the opcode that follows. It merely defines additional operational conditions for the opcode.

Escape opcodes provide an extension to the instruction set. For example, the escape opcodes 0xD8 through 0xDF are used to indicate that the second opcode byte 217 contains a value defining an instruction for the floating-point unit. The decoder passes the opcode to the floating-point decoder.

For at least one embodiment of the extended instruction set discussed herein, the 3-byte escape opcode is a two-byte entity having a value of 0x0F3y, where y is 0x8, 0x9, 0xA or 0xB. The 3-byte escape opcode value in the 3-byte escape code field 118c indicates to the decoder that the instruction-specific opcode value in the third byte 225 of the opcode field 200 indicates an instruction in the new instruction set.

In contrast to the 2-byte escape opcode discussed above in connection with the first extended instruction type 222, the value in the 3-byte escape opcode field 118c indicates to the decoder the method to be used to determine the length of the defined type 0 instruction. That is, each value for the 3-byte escape opcode is associated with a particular method to be used to determine the instruction length for every instruction in the map corresponding to the particular 3-byte escape code. For instance, the value 0x0F38 in the 3-byte escape opcode field 118c is associated with an associated opcode map. The length for each instruction in the 0x0F38 opcode map may be calculated using the same length-determination method used to determine the length of the other instructions in the 0x0F38 opcode map.

Similarly, the length of each instruction of the respective opcode maps associated with the remaining 3-byte escape opcode values (0x0F39, 0x0F3A, 0x0F3B) may be calculated with the same length-determination logic used to determine the length of the other instructions in the respective opcode map.

The length-determination logic used to determine the length of instructions for each instruction in one of the new opcode maps is simplified in that the same set of input terms is evaluated to determine the length of each instruction in the opcode map. Such length-determination logic is referred to herein as a "fixed-input" logic or method. That is, each input term evaluated to determine the length of one instruction in the map is also relevant to determination of the length of every other instruction in the map. The fixed set of terms to be evaluated may differ from opcode map to opcode map. While the set of inputs to be evaluated may differ among opcode maps, the inputs evaluated to determine instruction length are the same across all instructions in a give 3-byte opcode map.

The combination of a prefix and an escape opcode provides a significant enlargement of a processor's opcode table to allow additional new instruction sets. This combination uses the existing prefix codes to define a new set of instructions, in addition to the instruction set created by the escape opcodes. By using the existing prefix codes, the decoding circuitry for the existing instruction set may remain relatively unmodified to support decoding of the new instructions 118c (FIG. 1).

The instruction-specific opcode values (in the third byte 225 of the opcode field 220) of some or all of the new instructions may be the same as the opcodes of the existing instructions. By using the same opcodes with the prefix and escape opcodes to define a new set of instructions, the decoding circuitry may be less complex than having a completely new set of opcodes for the new instruction set.

In one embodiment, the prefix value 0x66 is used to define new instructions. Other prefixes can be similarly used. Furthermore, prefixes can still be used in the traditional role of enhancing the opcode or qualifying the opcode under some operational condition.

Table 1, below, sets forth examples of the new instruction set using prefixes and three-byte escape opcodes.

TABLE 1

| Instruction | (Prefix)/Escape Opcode/ Instruction-specific opcode (in hex) | Definition |
|---|---|---|
| PHADDW | 0F 38 01/r | Add horizontally packed numbers from 64-bit register or memory to 64-bit register |
| PHADDW | (66) 0F 38 01/r | Add horizontally packed numbers from 128-bit register or memory to 128-bit register |
| PHADDD | 0F 38 02/r | Add horizontally packed numbers from 64-bit register or memory to 64-bit register |
| PHADDD | (66) 0F 38 02/r | Add horizontally packed numbers from 128-bit register or memory to 128-bit register |
| PHADDSW | 0F 38 03/r | Add horizontally packed numbers with saturation from 64-bit register or memory to 64-bit register |
| PHADDSW | (66) 0F 38 03/r | Add horizontally packed numbers with saturation from 128-bit register or memory to 128-bit register |
| PHSUBW | 0F 38 05/r | Subtract horizontally packed signed words in 64-bit register or memory to 64-bit register |
| PHSUBW | (66) 0F 38 05/r | Subtract horizontally packed signed words in 128-bit register or memory to 128-bit register |
| PHSUBD | 0F 38 06/r | Subtract horizontally packed signed double words in 64-bit register or memory to 64-bit register |
| PHSUBD | (66) 0F 38 06/r | Subtract horizontally packed signed double words in 128-bit register or memory to 128-bit register |
| PHSUBSW | 0F 38 07/r | Subtract horizontally packed signed words in 64-bit register or memory to 64-bit register as saturated result |
| PHSUBSW | (66) 0F 38 07/r | Subtract horizontally packed signed words in 128-bit register or memory to 128-bit register as saturated result |
| PMADDUBSW | 0F 38 04/r | Multiply and add packed signed and unsigned number in 64-bit register or memory to 64-bit register |
| PMADDUBSW | (66) 0F 38 04/r | Multiply and add packed signed and unsigned number in 128-bit register or memory to 128-bit register |
| PMULHRSW | 0F 38 0B/r | Packed multiply high with round and scaling from 64-bit register or memory to 64-bit register |
| PMULHRSW | (66) 0F 38 0B/r | Packed multiply high with round and scaling from 128-bit register or memory to 128-bit register |
| PSHUFB | 0F 38 050/r | Packed shuffle bytes in 64-bit register or memory to 64-bit register |
| PSHUFB | (66) 0F 38 00/r | Packed shuffle bytes in 128-bit register or memory to 128-bit register |
| PSIGNB | 0F 38 08/r | Packed sign byte 64-bit register or memory to 64-bit register |
| PSIGNB | (66) 0F 38 08/r | Packed sign byte 128-bit register or memory to 128-bit register |
| PSIGNW | 0F 38 09/r | Packed sign word 64-bit register or memory to 64-bit register |
| PSIGNW | (66) 0F 38 09/r | Packed sign word 128-bit register or memory to 128-bit register |
| PSIGND | 0F 38 0A/r | Packed sign double word 64-bit register or memory to 64-bit register |
| PSIGND | (66) 0F 38 0A/r | Packed sign double word 128-bit register or memory to 128-bit register |

TABLE 1-continued

| Instruction | (Prefix)/Escape Opcode/ Instruction-specific opcode (in hex) | Definition |
|---|---|---|
| PSRMRG | 0F 3A 0F/r | Pack shifted right and merge contents of 64-bit register or memory to 64-bit register |
| PSRMRG | (66) 0F 3A 0F/r | Pack shifted right and merge contents of 128-bit register or memory to 128-bit register |
| PABSB | 0F 38 1C/r | Packed byte absolute value of value in 64-bit register or memory to 64-bit register as unsigned result |
| PABSB | (66) 0F 38 1C/r | Packed byte absolute value of value in 128-bit register or memory to 128-bit register as unsigned result |
| PABSW | 0F 38 1D/r | Packed word absolute value of value in 64-bit register or memory to 64-bit register as unsigned result |
| PABSW | (66) 0F 38 1D/r | Packed word absolute value of value in 128-bit register or memory to 128-bit register as unsigned result |
| PASBSD | 0F 38 1E/r | Packed double word absolute value of value in 64-bit register or memory to 64-bit register as unsigned result |
| PABSD | (66) 0F 38 1E/r | Packed double word absolute value of value in 128-bit register or memory to 128-bit register as unsigned result |

In the above examples, the instructions with the prefix 0x66 relate to instructions that utilize one or more extended-size registers (such as 128-bit register size), while the instructions without the prefix 0x66 relate to instructions that utilize one or more smaller-size registers (such as 64-bit register size). The smaller-size registers are referred to herein as "regular length" registers. As is known by one skilled in the art, the exact codes for prefixes are implementation-dependent and the 0x66 prefix value discussed above is merely for illustrative purposes.

Instruction Decoding Using 3-Byte Escape Opcodes

Figure 3:
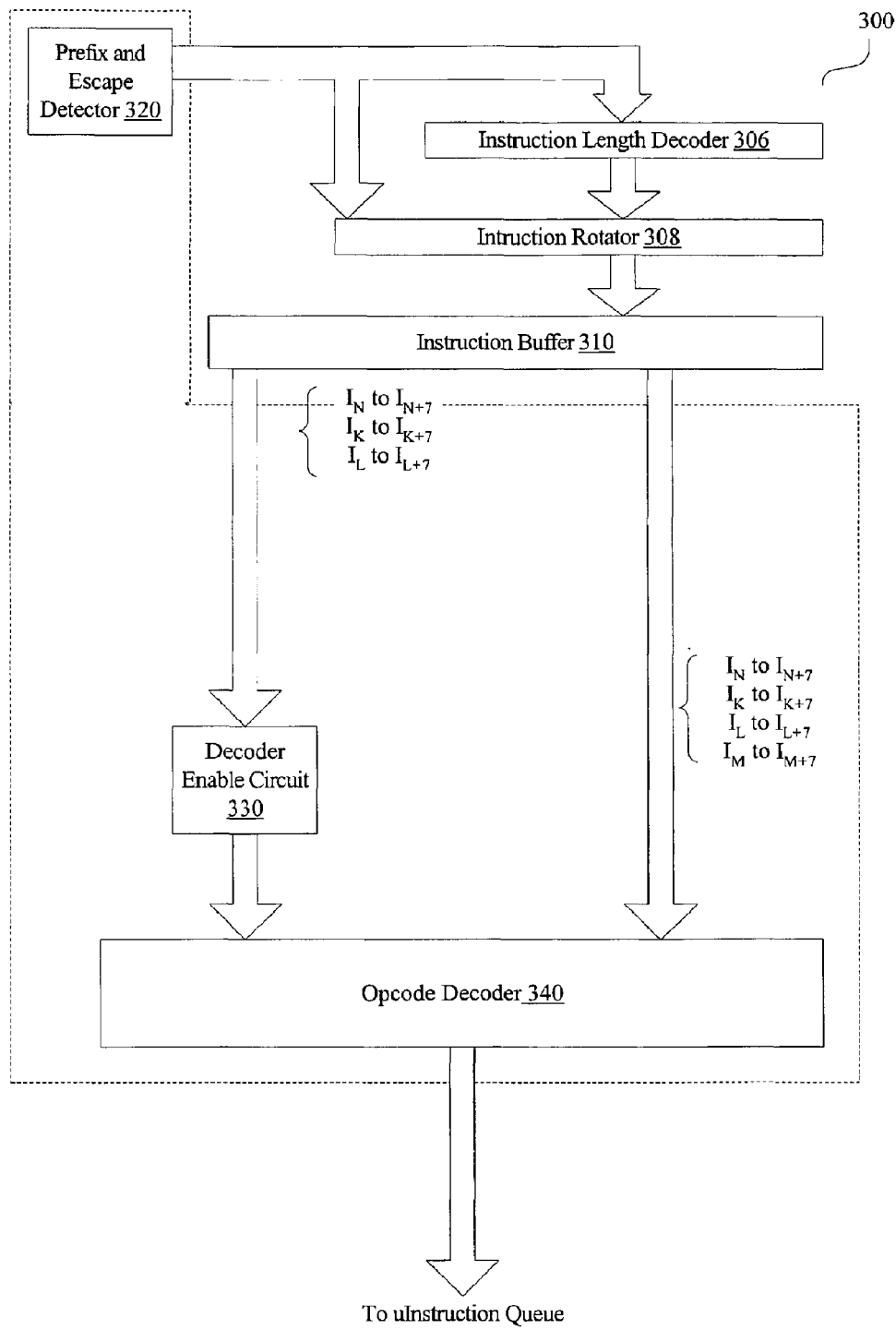
FIG. 3 is a block diagram illustrating at least one embodiment of a circuit to decode an instruction.

FIG. 3 is a diagram illustrating a circuit 300 to decode variable-length instructions. The circuit 300 may include an instruction length decoder 306, an instruction rotator 308, an instruction buffer 310, a prefix and escape detector 420, a decoder enable circuit 430, and an opcode decoder 440. The prefix and escape detector 420, the decoder enable circuit 430, and the opcode decoder 440 form all or part of the decode unit 116 illustrated in FIG. 1. While illustrated as a single entity, the prefix and escape code detector 320 may be implemented as separate escape detector and prefix detector blocks.

The instruction length decoder 306 determines the length of an actual instruction code that has been fetched from external memory (such as, e.g., memory 102, FIG. 2). For illustrative purposes, an instruction code is assumed to include up to five bytes: the first byte corresponds to $I_N$ to $I_{N+7}$, the second byte corresponds to $I_K$ to $I_{K+7}$, the third byte corresponds to $I_L$ to $I_{L+7}$, the fourth byte corresponds to $I_M$ to $I_{M+7}$, and the fifth byte corresponds to $I_P$ to $I_{P+7}$, where $I_N$ to $I_{N+7}$, $I_K$ to $I_{K+7}$, $I_L$ to $I_{L+7}$, $I_M$ to $I_{M+7}$, and $I_P$ to $I_{P+7}$, refer to the bit positions of the instruction code. In practice, however, an actual instruction may include more than five bytes in its instruction code. Similarly, an actual instruction may include less than five bytes in its instruction code.

For at least one embodiment, the five illustrates bytes of the instruction code are contiguous, such that K=N+8, L=K+8 and L=N+16, and M=L+8, M=K+16 and M=N+24, and so on. However, as is discussed above in connection with FIG. 2, the fields of the format 200 illustrated in FIG. 2 need not occupy the positions shown. Accordingly, the illustrative five bytes of an instruction code that are discussed herein may be in any order and need not be contiguous.

One of skill in the art will recognize that logic of the instruction length decoder 306 may implement fairly complex length decode methods in a system that supports variable-length instructions. This is especially true in systems that require different methods, that evaluate different inputs, to determine instruction length for instructions within the same opcode map. As is described below, embodiments of the present invention provide for simplified length decode processing by providing that the length of each instruction within an opcode map is determined by a single fixed-input length-determination logic.

The rotator 308 rotates the raw instruction bytes such that the first byte to be decoded is in an initial position. The rotator 308 thus identifies the beginning of the instruction bytes to be decoded. It should be noted that, although the rotator 308 may identify the first byte of an instruction, such as a prefix byte, the first byte need not be identified. For at least one embodiment, for instance, the rotator 308 identifies the least significant byte of the opcode and rotates it to the initial position of the instruction. For at least one other embodiment, the rotator 308 identifies the most significant byte of the opcode and rotates it to the initial position of the instruction.

The instruction buffer 310 receives and stores the instructions that have been fetched from the external memory. For at least one embodiment, the instructions are length-decoded and rotated before being received by the instruction buffer 310. For at least one embodiment, the instruction buffer 310 is implemented as an instruction cache.

The prefix and escape detector 320 receives the instruction bits $I_N$ to $I_{N+7}$, $I_K$ to $I_{K+7}$, $I_L$ to $I_{L+7}$, and detects the presence of one or more of a set of predefined prefixes and/or escape opcodes used as part of the new instruction set. The value of the prefix may be selected so that it is the same as a prefix used for the regular instruction set. The decoder enable circuit 330 utilizes the results of the prefix and escape detector 320 to generate enable or select signals to the individual opcode decoder. The opcode decoder 440 receives the instruction bits $I_N$ to $I_{N+7}$, $I_K$ to $I_{K+7}$, $I_L$ to $I_{L+7}$, $I_M$ to $I_{M+7}$, and $I_P$ to $I_{P+7}$, and translates the individual instruction codes into decoded instruction codes that specify the desired instruction.

Figure 4:
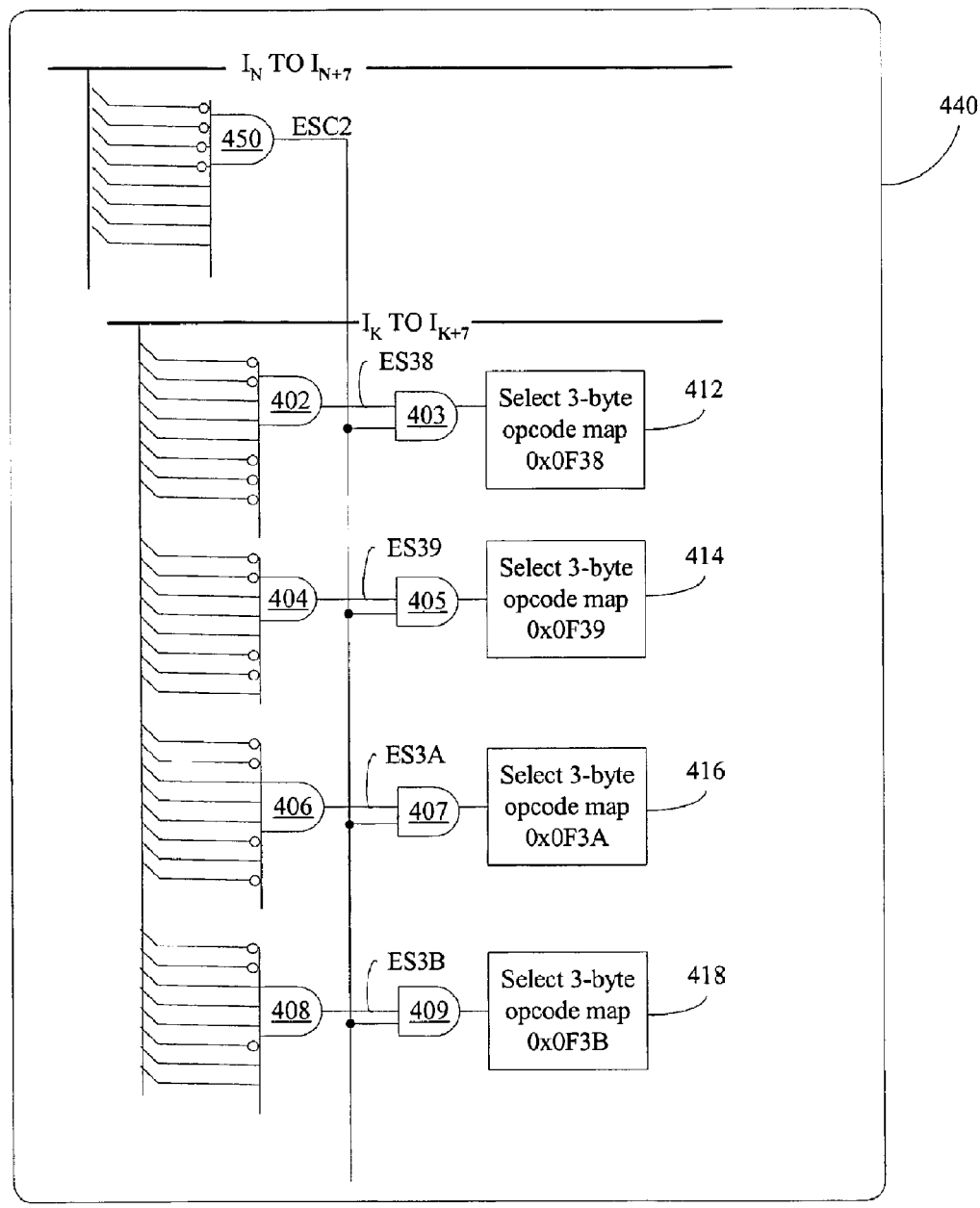
FIG. 4 is a diagram illustrating at least one embodiment of a circuit to decode a new type 1 instruction.

FIG. 4 is a block diagram illustrating at least one embodiment of a decoder circuit 440 to decode a new type 0 instruction. The decoder circuit 440 may be implemented as part of an opcode decoder, such as opcode decoder 340 illustrated in FIG. 3. For illustrative purposes in discussing FIG. 4, it is assumed that the rotator (308, FIG. 3) has indicated the first byte of the instruction opcode.

FIG. 4 illustrates that the decoder 440 includes an AND gate 450 that determines whether the first byte of the instruction, instruction bits $I_N$ to $I_{N+7}$, match the 2-byte escape opcode value 0x0F. The signal ESC2 is asserted if the instruction bits $I_N$ to $I_{N+7}$ represent the 2-byte escape opcode 0x0F.

Decoder 440 also includes AND gates 402, 404, 406, 408. AND gate 402 matches the instruction bits $I_K$ to $I_{K+7}$ with the 3-byte escape opcode value, 0x38, and generates a signal ES38. The signal ES38 is asserted if the instruction bits $I_K$ to $I_{K+7}$ represent the 3-byte escape opcode 0x38.

If instruction bits $I_N$ to $I_{N+7}$ represent the 2-byte escape opcode 0x0F, and the instruction bits $I_K$ to $I_{K+7}$ represent the 3-byte escape opcode 0x38, the instruction is a new type 0 instruction 226. If both ESC2 and ES38 are asserted, then AND gate 403 evaluates to true, enabling logic 412. Logic 412 selects, in order to decode the value in the instruction-specific opcode field 225 (FIG. 2), the 3-byte opcode map for instructions having the 3-byte escape code value 0x38.

AND gate 404 matches the instruction bits $I_K$ to $I_{K+7}$ with the 3-byte escape opcode value, 0x39, and generates a signal ES39. The signal ES39 is asserted if the instruction bits $I_K$ to $I_{K+7}$ represent the 3-byte escape opcode 0x39. If instruction bits $I_N$ to $I_{N+7}$ represent the 2-byte escape opcode 0x0F, and the instruction bits $I_K$ to $I_{K+7}$ represent the 3-byte escape opcode 0x39, the instruction is a new type 0 instruction 226. If both ESC2 and ES39 are asserted, then AND gate 405 evaluates to true, enabling logic 414. Logic 414 selects, in order to decode the value in the instruction-specific opcode field 225 (FIG. 2), the 3-byte opcode map for instructions having the 3-byte escape code value 0x39.

AND gate 406 matches the instruction bits $I_K$ to $I_{K+7}$ with the 3-byte escape opcode value, 0x3A, and generates a signal ES3A. The signal ES3A is asserted if the instruction bits $I_K$ to $I_{K+7}$ represent the 3-byte escape opcode 0x3A. If instruction bits $I_N$ to $I_{N+7}$ represent the 2-byte escape opcode 0x0F, and the instruction bits $I_K$ to $I_{K+7}$ represent the 3-byte escape opcode 0x3A, the instruction is a new type 0 instruction 226. If both ESC2 and ES3A are asserted, then AND gate 405 evaluates to true, enabling logic 416. Logic 416 selects, in order to decode the value in the instruction-specific opcode field (225 FIG. 2), the 3-byte opcode map for instructions having the 3-byte escape code value 0x3A.

AND gate 408 matches the instruction bits $I_K$ to $I_{K+7}$ with the 3-byte escape opcode value, 0x3B, and generates a signal ES3B. The signal ES3B is asserted if the instruction bits $I_K$ to $I_{K+7}$ represent the 3-byte escape opcode 0x3B. If instruction bits $I_N$ to $I_{N+7}$ represent the 2-byte escape opcode 0x0F, and the instruction bits $I_K$ to $I_{K+7}$ represent the 3-byte escape opcode 0x3B, the instruction is a new type 0 instruction 226. If both ESC2 and ES3B are asserted, then AND gate 40y evaluates to true, enabling logic 418. Logic 418 selects, in order to decode the value in the instruction-specific opcode field 225 (FIG. 2), the 3-byte opcode map for instructions having the 3-byte escape code value 0x3B.

Figure 5:
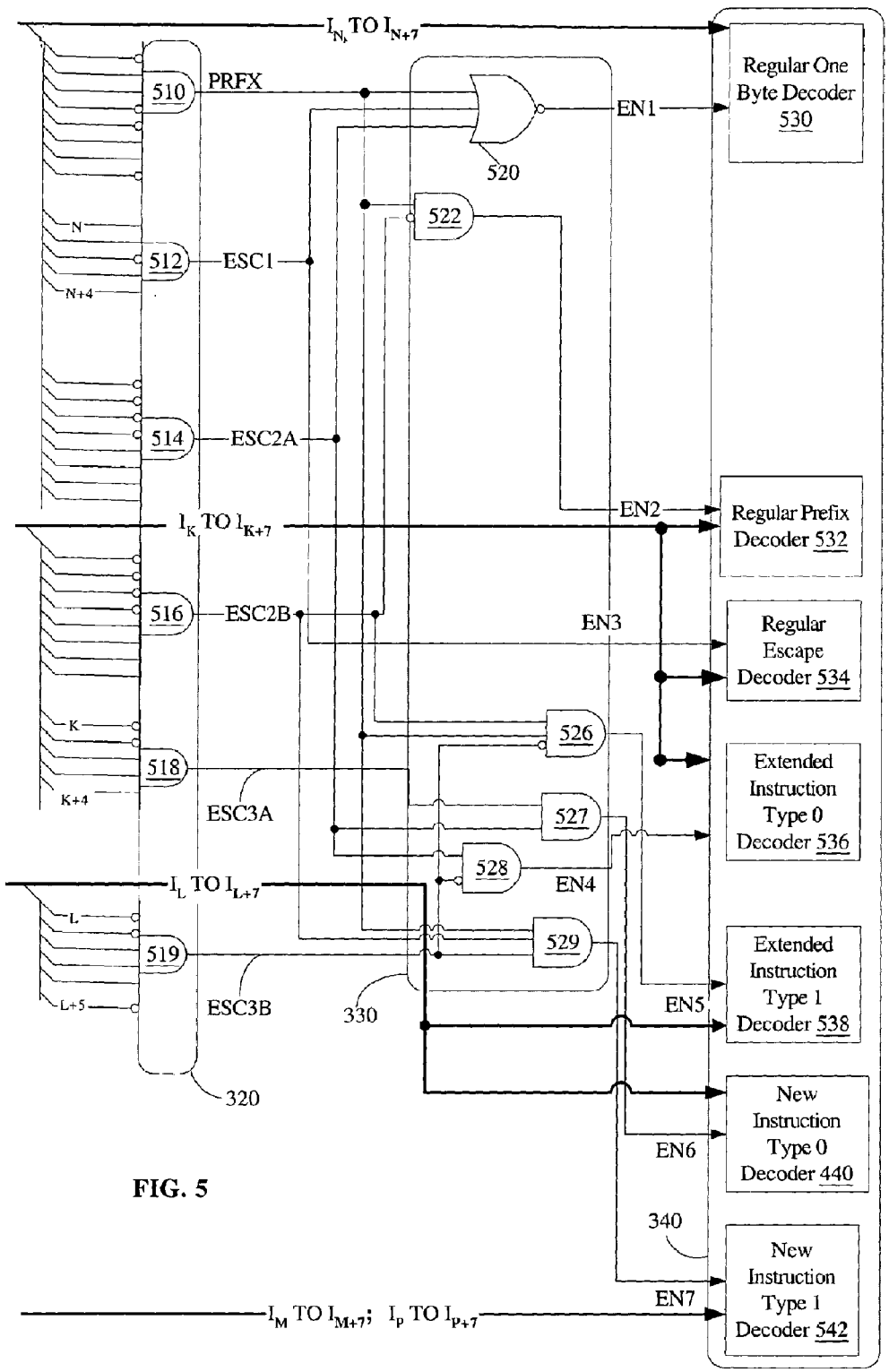
FIG. 5 is a diagram illustrating a prefix and escape detector, a decoder enable circuit, and an opcode decoder according to at least one embodiment of the invention.

FIG. 5 is a diagram illustrating further detail of a decoder, such as opcode decoder 340 illustrated in FIG. 3, as well as additional detail of the prefix and escape detector 320 and the decoder enable circuit 330.

For illustrative purposes, it is assumed that, for an example instruction set, there is one 0x66 prefix, and three escape opcodes: the regular escape opcodes 0xD8-0xDF, the two-byte escape opcode 0x0F, and the three-byte escape opcodes 0x0F38-0x0F3B.

For illustrative purposes it is also assumed that the rotator (308, FIG. 3) has indicated the first byte of the instruction code, which may be the prefix. One will appreciate, however, that in practice an instruction may be rotated to other bytes, such as the least significant byte of the opcode, and that the functionality illustrated in FIG. 5 may be modified accordingly.

FIG. 5 illustrates that additional bytes of the instruction, in addition to those indicated in FIG. 3, may be routed to a particular individual decoder 530, 532, 534, 536, 538, 440, 542. For instance, FIG. 5 illustrates that instruction words $I_M$ to $I_{M+7}$ and $I_P$ to $I_{P+7}$ may be routed to the decoder 542 for new instruction type 1. Certain features of the circuit illustrated in FIG. 5 have been intentionally excluded in order to simplify the figure and in order to avoid obscuring features of the selected embodiments. However, one skilled in the art will recognize that other bytes of the instruction words, in addition to those illustrated in FIG. 5, may be routed to the other decoders 530, 532, 534, 536, 538, 440.

The prefix and escape detector 320 includes 5 AND gates 510, 512, 514, 516, 518, and 520. Generally, AND gates 510, 512, and 514 match the instruction bits $I_N$ to $I_{N+7}$ with the corresponding prefix code and escape opcode.

The AND gate 510 matches the instruction bits $I_N$ to $I_{N+7}$ with the prefix code, 0x66, and generates a signal PRFX. The signal PRFX is asserted if the instruction bits $I_N$ to $I_{N+7}$ represent the prefix 0x66.

The AND gate 512 matches the instruction bits $I_N$ to $I_{N+7}$ with the escape opcodes 0xD8-0xDF, and generates a signal ESC1. The signal ESC1 is asserted if the instruction bits $I_N$ to $I_{N+7}$ represent any of the escape opcodes 0xD8 to 0xDF.

The AND gate 514 matches the instruction bits $I_N$ to $I_{N+7}$ with the 2-byte escape opcode, 0x0F, and generates a signal ESC2A. The signal ESC2A is asserted if the instruction bits $I_N$ to $I_{N+7}$ represent the 2-byte escape opcode 0x0F. If instruction bits $I_N$ to $I_{N+7}$ represent the 2-byte escape opcode 0x0F, then the instruction may be either an extended type 0 instruction 222 or a new type 0 instruction 228. Therefore, as is described below, additional AND gate 518 evaluates a third set of bits $I_L$ to $I_{L+7}$ to determine if the second half of a three-byte opcode is present.

In the foregoing manner, the prefix and escape detector 320 determines whether a first set of bits $I_N$ to $I_{N+7}$ of an instruction opcode includes the prefix value 0x66 or one of the escape opcode values. If the first set of bits includes the prefix value, then the instruction may be an extended type 1 instruction 224 or a new type 1 instruction 228. Thus, a second set of bits $I_K$ to $I_{K+7}$ is evaluated to determine if it contains the value 0x0F. (If it doesn't, then the prefix is assumed to be a traditional prefix rather than part of the opcode of an instruction).

Accordingly, the AND gate 516 matches the instruction bits $I_K$ to $I_{K+7}$ with the 2-byte escape opcode, 0x0F, and generates a signal ESC2B. The signal ESC2B is asserted if the instruction bits $I_K$ to $I_{K+7}$ represent the 2-byte escape opcode 0x0F.

In addition, the AND gate 518 evaluates instruction bits $I_K$ to $I_{K+7}$ to determine if the second half of a three-byte opcode is present in the bits. Such evaluation is useful in the event that the first set of bits $I_N$ to $I_{N+7}$ contain the value 0x0F. The AND gate 518 matches the instruction bits $I_K$ to $I_{K+7}$ with the second half of the 3-byte escape opcodes and generates a signal ESC3A. The signal ESC3A is asserted if the instruction bits $I_K$ to $I_{K+7}$ contain the value 0x38, 0x39, 0x3A or 0x3B.

In the foregoing manner, the prefix and escape detector circuit 320 determines whether a second set of bits $I_K$ to $I_{K+7}$ of an instruction opcode includes one of the escape opcode values. If the second set of bits $I_K$ to $I_{K+7}$ includes the second half of a three-byte opcode value, then the instruction may be a new type 0 instruction 226. However, if the second set of bits $I_K$ to $I_{K+7}$ contains the value 0x0F, then the instruction may be either an extended type 1 instruction 224 or a new type 1 instruction 228. Accordingly, a third set of bits $I_L$ to $I_{L+7}$ is evaluated to determine if it contains the second half of one of the three-byte escape opcodes. That is, the third set of bits $I_L$ to $I_{L+7}$ is evaluated to determine if it contains the values 0x38, 0x39, 0x3A or 0x3B.

Accordingly, FIG. 5 illustrates that the AND gate 519 matches the instruction bits $I_L$ to $I_{L+7}$ with the second byte of the 3-byte escape opcode, 0x38-0x3B, and generates a signal ESC3B. The signal ESC3B is asserted if the instruction bits $I_L$ to $I_{L+7}$ represent the second byte of any of the three byte escape opcodes 0x0F38 through 0x0F3B.

As is known by one skilled in the art, other logic gates can be employed to perform the matching or decoding of the instruction bits $I_N$ to $I_{N+7}$, $I_K$ to $I_{K+7}$, and $I_L$ to $I_{L+7}$.

The decoder enable circuit 330 receives the PRFX, ESC1, ESC2A, ESC2B, ESC3A, and ESC3B signals to generate the enable signals to the individual decoders. The decoder enable circuit 330 includes a NOR gate 520, and AND gates 522, 526, 527, 528, and 529. One skilled in the art will recognize that all or part of the individual decoders may be implemented together in a single device such as a programmable logic array.

The NOR gate 520 asserts the EN1 signal when all the PRFX, ESC1, and ESC2A are negated. This condition corresponds to the condition where the instruction bits $I_N$ to $I_{N+7}$ do not match a prefix, a floating-point escape opcode, nor a 2-byte escape opcode. Therefore, the instruction bits $I_N$ to $I_{N+7}$ correspond to an opcode of a one-byte regular instruction.

The AND gate 522 asserts the EN2 signal when the PRFX signal is asserted and the ESC2B is negated. Assertion of the EN2 signal corresponds to the condition where the instruction bits $I_N$ to $I_{N+7}$ match the prefix code but the instruction bits $I_K$ to $I_{K+7}$ do not match the 2-byte escape opcode. Therefore this condition corresponds to an opcode using the prefix as a qualifier of a regular instruction.

The ESC1 signal is used as the EN3 signal. This signal is asserted when the instruction bits $I_N$ to $I_{N+7}$ match the floating-point escape opcode. Therefore this condition corresponds to a floating-point opcode of a regular instruction.

The AND gate 528 asserts the EN4 signal when the ESC2A signal is asserted and the ESC3B signal is negated. Assertion of the EN4 signal corresponds to the condition where instruction bits $I_N$ to $I_{N+7}$ match the 2-byte escape opcode and instruction bits $I_L$ to $I_{L+7}$ do not match the second half any of the three-byte escape opcodes. Therefore this condition corresponds to an opcode of extended instruction type 0.

The AND gate 526 asserts the EN5 signal when the PRFX and ESC2B signals are asserted and the ESC3B signal is not asserted. This condition corresponds to the condition where the instruction bits $I_N$ to $I_{N+7}$ match the prefix code and the instruction bits $I_K$ to $I_{K+7}$ match the 2-byte escape opcode, but instruction bits $I_L$ to $I_{L+7}$ do not match the second half any of the three-byte escape opcodes. Therefore this condition corresponds to an opcode of extended instruction type 1.

The AND gate 527 asserts the EN6 signal when the ESC2A signal and the ESC3B signal are both asserted. Assertion of the EN6 signal corresponds to the condition where instruction bits $I_N$ to $I_{N+7}$ match the 2-byte escape opcode and instruction bits $I_L$ to $I_{L+7}$ match the second half one of the three-byte escape opcodes. Therefore this condition corresponds to an opcode of new instruction type 0.

The AND gate 529 asserts the EN7 signal when the PRFX, ESC2B, and ESC3B signals are asserted. Assertion of the EN7 signal corresponds to the condition where the instruction bits $I_N$ to $I_{N+7}$ match the prefix code and the instruction bits $I_K$ to $I_{K+7}$ match the 2-byte escape opcode, and instruction bits $I_L$ to $I_{L+7}$ match the second half one of the three-byte escape opcodes. Therefore this condition corresponds to an opcode of new instruction type 1.

The opcode decoder 340 includes a regular one-byte decoder 530, a regular prefix decoder 532, a regular escape decoder 534, an extended instruction type 0 decoder 536, an extended instruction type 1 decoder 538, a new instruction type 0 decoder 440 and a new instruction type 1 decoder 542. Although these decoders 530, 532, 534, 536, 538, 440, 542 are shown in separate blocks, in practice the decoding of these instructions may be combined.

Figure 6:
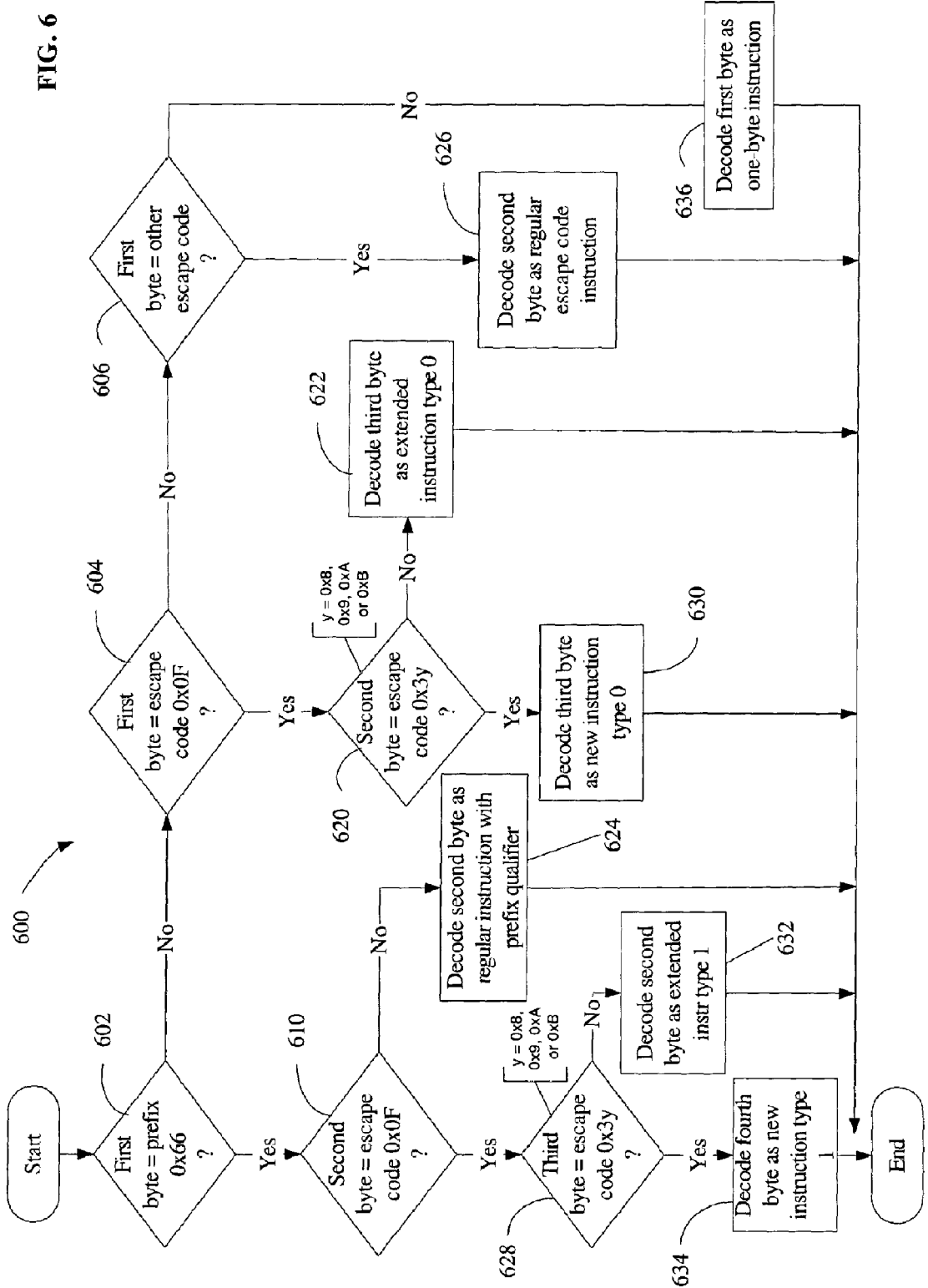
FIG. 6 is a flowchart illustrating a process to perform instruction decoding using prefixes according to at least one embodiment of the invention.

FIG. 6 is a flowchart illustrating a method 600 to perform instruction decoding for instructions of a format defined in an instruction set, where the instruction set includes instructions encoded using 3-byte escape opcodes. One skilled in the art will recognize that the processing blocks 602-636 illustrated in FIG. 6 need not be performed in the order shown. Such processing blocks 602-636 may be performed in a different order. For instance, the valid prefix determination 602 may be performed after the two-byte escape opcode determinations 604, 610. Alternatively, some or all of the processing blocks illustrated in FIG. 6 may be performed concurrently with the processing of other blocks.

FIG. 6 illustrates that the method 600 begins at START and processing proceeds to block 602. At block 602 the method 600 determines if the first byte, instruction bits $I_N$ to $I_{N+7}$, matches the prefix code 0x66. If not, then processing proceeds to block 604. Otherwise, processing proceeds to block 610.

At block 610, the method 600 determines if the second byte of the instruction, instruction bits $I_N$ to $I_{N+7}$, matches a 2-byte escape opcode value. For at least one embodiment, the value of the two-byte escape opcode is 0x0F. If the escape opcode check 610 evaluates to "false", then processing proceeds to block 624. At block 624, it has been determined that the first byte, instruction bits $I_N$ to $I_{N+7}$, matches the prefix code 0x66 (see block 602) and that the second byte, instruction bits $I_K$ to $I_{K+7}$, does not match the two-byte escape opcode (see block 610). Accordingly, at block 624 the second byte of the instruction, instruction bits $I_K$ to $I_{K+7}$, is decoded as the opcode of a regular instruction with a prefix qualifier.

If the escape opcode check 610 evaluates to "true," then processing proceeds to block 628 to determine if the instruction is a new type 1 instruction. At block 628, the method determines whether the third byte of the instruction, instruction bits $I_L$ to $I_{L+7}$, matches the second half of a three-byte escape opcode value. For at least one embodiment, the three-byte escape opcode values are 0x0F38, 0x0F39, 0x0F3A, and 0x0F3B. Accordingly, at block 628 it is determined whether the third byte of the instruction, instruction bits $I_L$ to $I_{L+7}$, matches the values 0x038, 0x039, 0x03, or 0x03B. If not, then processing proceeds to block 632. However, if the three-byte escape opcode check 628 evaluates to true, then processing proceeds to block 634. At block 634, the fourth byte of the instruction, instruction bytes $I_M$ to $I_{M+7}$, is decoded as the opcode of a new type 1 instruction. Processing then terminates.

At block 632, the third byte of the instruction, instruction bits $I_L$ to $I_{L+7}$, is decoded as the opcode of an extended type 1 instruction having the value 0x66 in the first byte of the instruction and the two-byte escape opcode value, 0x0F, in the second byte of the instruction. Processing then terminates.

At block 604, processing continues when it has been determined at block 602 that the first byte of the instruction, instruction bits $I_K$ to $I_{K+7}$, does not match the prefix value 0x66. At block 604, it is determined whether the first byte of the instruction, instruction bits $I_K$ to $I_{K+7}$, matches the two-byte escape value. If not, then processing proceeds to block 606. However, if the two-byte escape opcode evaluation 604 evaluates to "true," then processing continues at block 620 to determine if the instruction is a new type 0 instruction.

At block 620, the method determines whether the second byte of the instruction, instruction bits $I_K$ to $I_{K+7}$, matches the second half of a three-byte escape opcode value. For at least one embodiment, the three-byte escape opcode values are 0x0F38, 0x0F39, 0x0F3A, and 0x0F3B. Accordingly, at block 620 it is determined whether the second byte of the instruction, instruction bits $I_K$ to $I_{K+7}$, matches the values 0x38, 0x39, 0x3A, or 0x3B. If not, then processing proceeds to block 622. However, if the three-byte escape opcode check 620 evaluates to true, then processing proceeds to block 630.

At block 630, the third byte of the instruction, instruction bytes $I_L$ to $I_{L+7}$, is decoded as the opcode of a new type 0 instruction. Processing then terminates.

If the three-byte escape opcode check 620 evaluates to "false," then processing proceeds to block 622. At block 622, the third byte of the instruction, instruction bytes $I_L$ to $I_{L+7}$, is decoded as the opcode of an extended type 0 instruction having the prefix value 0x66 in its first byte and the two-byte opcode value 0x0F in its second byte.

At block 606, processing continues when it has been determined at block 604 that the first byte of the instruction, instruction bits $I_K$ to $I_{K+7}$, do not match the two-byte escape opcode value. At block 606, the method 600 determines if the first byte matches another escape opcode (e.g., the floating-point escape opcodes—0xD8 through 0xDF). If not, processing proceeds to block 636 to decode the first byte as a one-byte regular instruction. Processing then terminates.

If, however, the other-escape-code evaluation 606 evaluates to "true," then processing proceeds to block 626, wherein the second byte is decoded as the opcode of other regular instructions (e.g., floating-point instructions). Processing then terminates.

Figure 7:
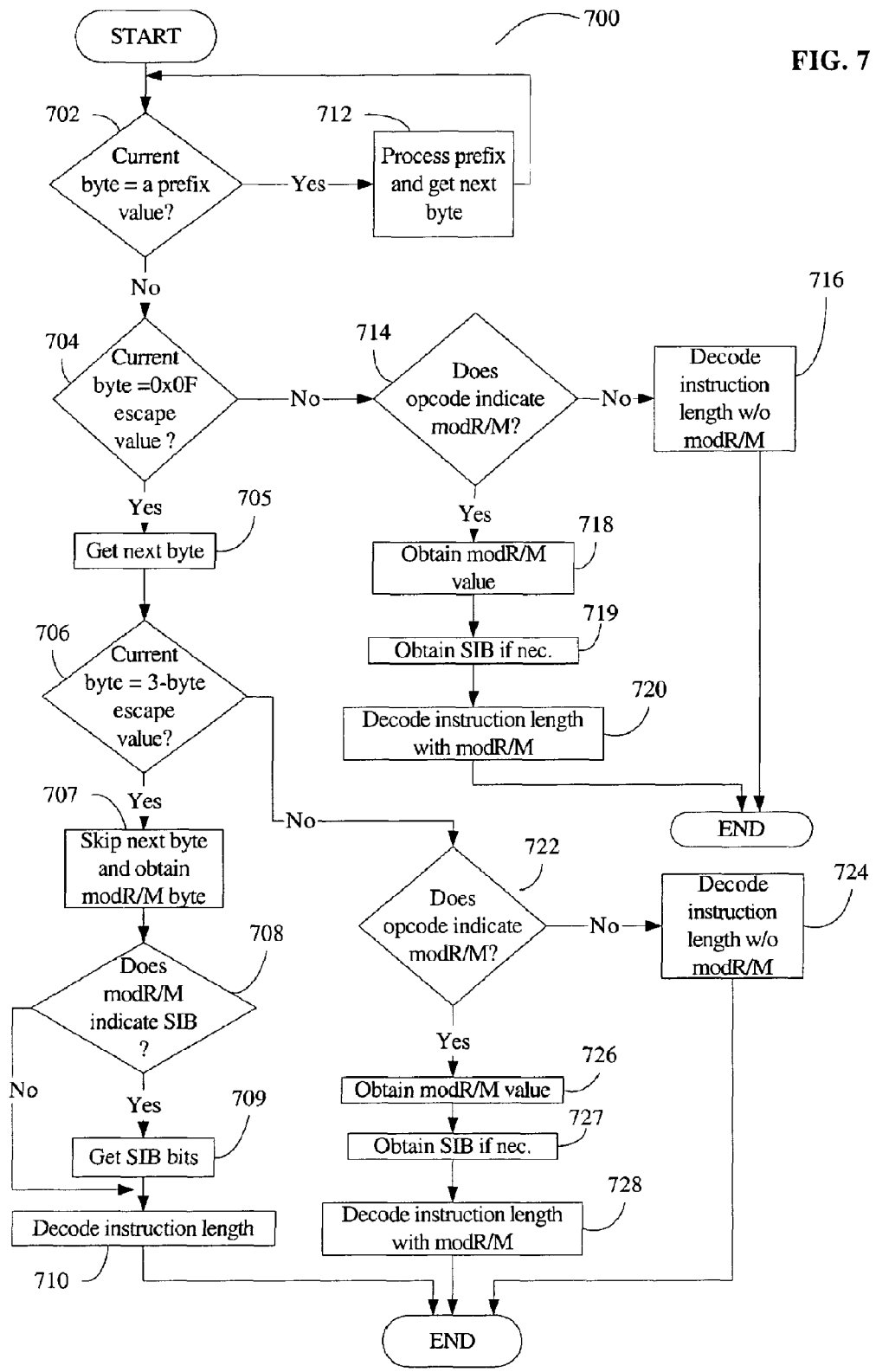
FIG. 7 is a flowchart illustrating at least one embodiment of a method for decoding the length of an instruction.

FIG. 7 illustrates a method 700 for determining the length of an instruction that has been retrieved from memory. For at least one embodiment, the method 700 is performed by an instruction length decoder (such as, e.g., 306 in FIG. 3).

FIG. 7 illustrates that processing begins at START and proceeds to block 702. At block 702, it is determined whether the current instruction byte is a prefix byte. On a first pass of the method 700, the current byte is the first byte of an instruction. If the current byte is determined at block 702 to contain a prefix value as defined in the instruction set, then the prefix is processed at block 712 and the next byte is retrieved for processing.

Processing then returns to block 702 in order to determine if the new current byte, retrieved at block 712, contains a prefix value. In this manner, the method 700 provides for decoding the length of an instruction that includes multiple prefix bytes. For at least one embodiment, as is stated above, an instruction may include up to four prefix bytes.

If it is determined at block 702 that the current byte of the instruction does not include a prefix value, then processing proceeds to block 704. At block 704 it is determined whether the current byte of the instruction includes a two-byte escape code value, such as 0x0F. If not, then processing proceeds to block 714, which is discussed in further detail below.

If the current byte of the instruction is determined at block 704 to include the two-byte escape code value, then the instruction may be a new type 0 or new type 1 instruction. Accordingly, at block 705 the next byte of the instruction is obtained and at block 706 it is determined whether the newly-obtained byte contains one of the 3-byte escape code values. If so, then it has been determined that the instruction is a new type 0 or type 1 instruction.

To determine the length of the new type 0 or new type 1 instruction, the contents of the modR/M field 230 is evaluated. Accordingly, the contents of the modR/M byte for the current instruction code is retrieved at block 707. At block 708, it is determined if the modR/M value indicates that a SIB value should be retrieved from the current instruction code. If so, all or part of the contents of the SIB field 240 (FIG. 2) is retrieved and processing proceeds to block 710. If not, processing proceeds to block 710. Significantly, due to the simplified length decode method (see block 710) disclosed herein, it is not necessary to evaluate the contents of the instruction-specific opcode field 225 (FIG. 2) when decoding the length of a new type 0 or new type 1 instruction. Accordingly, such byte is not retrieved, and is thus "skipped", at block 707.

At block 710, the length of new type 1 and new type 0 instructions is determined in order to establish where the instruction begins and ends. In order to determine the length of the instruction, the block 710 evaluates the contents of at least three bytes of the instruction. Of course, one skilled in the art will recognize that more or fewer bytes may be evaluated to determine the length of instructions other than new type 1 and new type 0 instructions.

At block 710, the first, second, and fourth instruction bytes are evaluated to determine the length of a new type 0 instruction. In addition, at least some bits of a fifth instruction byte are evaluated if an SIB value is present. That is, for a new type 0 instruction block 710 evaluates the contents of the three-byte escape opcode field 118c (FIG. 2), the modR/M field (230, FIG. 2), and 3 bits of the SIB field (240, FIG. 2), if a value for the SIB field is present. The length is determined as follows:

If ((Byte1==0x0F) AND (Byte2==0x38 or 0x39 or 0x3A or 0x3B) AND (Byte4=modR/M byte has no displacement and no sib required)) then Instruction_length=4

Else if ((Byte1==0x0F) AND (Byte2==0x38 or 0x39 or 0x3A or 0x3B) AND (Byte4=modR/M byte has displacement or sib required)) then Instruction-length is calculated based on value of modR/M field (230, FIG. 2) and value of three bits in SIB field (240, FIG. 2).

Accordingly, the length decode block 710 for a new type 0 instruction need not evaluate the third opcode byte to determine the length of the instruction. Also, for each opcode map the corresponding length-determination logic receives the same set of fixed inputs to evaluate the length of each instruction in the respective map. For instance, for the 0x0F38 opcode map, the length-determination logic evaluates the modR/M byte at block 708. If the value in the modR/M byte indicates that no SIB byte is present in the current instruction code, then the instruction length is decoded 710 without evaluating an SIB byte.

If, on the other hand, an SIB value is present, then one or more bits in the SIB field 240 (FIG. 2) are evaluated in order to determine 710 the length of the instruction code. The value in the instruction-specific opcode field 225 (FIG. 2) is not evaluated to determine the length of an instruction in the 0x0F38 opcode map. Nor is any input, other than modR/M and SIB values (if indicated) evaluated for any instruction in the opcode map. Accordingly, a fixed set of instructions is evaluated to determine the length of an instruction in the given opcode map, wherein each input is relevant to determining the length of each instruction in the opcode map.

A particular input is "relevant" to determining the length of an instruction code if, given the value of one or more other inputs, the particular input is used to determine the length of the instruction code. For instance, the SIB value is relevant to every instruction in the 0x0F38 opcode map because, for each instruction in the map, the SIB value will be evaluated to determine length depending on the value of the modR/M. In contrast, the value of the instruction specific opcode 225 (FIG. 2) is not relevant to determination of any instruction in the opcode map because it is not evaluated to determine length, regardless of the value of the other inputs. Similarly, other inputs such as the value of the displacement field 250 (FIG. 2) are not relevant to determining instruction length if they would not be used to evaluate instruction length under any combination of values of the relevant inputs.

In this manner, decode logic for a new type 0 is kept relatively simple. For at least one embodiment, no additional bytes are evaluated to determine which length decode logic to use for a new type 0 instruction in comparison to the number of bytes evaluated to determine which length decode logic to use for an extended type 0 instruction. This simplicity is maintained for all instructions in the new opcode maps because the same method is applied to determine the length of each instruction in a given opcode map.

As used herein, an opcode map is meant to refer to the group of instructions specified by a certain combination of values in the instruction bytes. For example, all instructions specified by 0F:38:1b"xxxxxxxx" and 66:0F:38:1b"xxxxxxxx", are considered to be part of the opcode map for the 0F:38 3-byte escape code value. Similarly, the 0F:39 opcode map is meant to refer to the group of instructions specified by 0F:39:1b"xxxxxxxx" and 66:0F:39:1b"xxxxxxxx", the 0F:3A opcode map is meant to refer to the group of instructions specified by 0F:3A:1b"xxxxxxxx" and 66:0F:3A:1b"xxxxxxxx", and the 0F:3B opcode map is meant to refer to the group of instructions specified by 0F:3B:1b"xxxxxxxx" and 66:0F:3B:1b"xxxxxxxx", where 1b"xxxxxxxx" is a defined opcode of the specified opcode map.

At block 710, the second, third, and fifth instruction bytes are evaluated to determine the length of a new type 1 instruction. In addition, at least some bits of a sixth instruction byte are evaluated if an SIB value is present. Similar to processing for new type 0 instructions, block 622 evaluates the two bytes that hold the three-byte escape opcode field value (118c, FIG. 2), the modR/M field (230, FIG. 2), and 3 bits of the SIB field (240, FIG. 2), if a value for the SIB field is present. The length is determined as follows:

If ((Byte2==0x0F) AND (Byte3==0x38 or 0x39 or 0x3A or 0x3B) AND (Byte5=modR/M byte has no displacement and no sib required)) then Instruction_length=4

Else if ((Byte1==0x0F) AND (Byte2==0x38 or 0x39 or 0x3A or 0x3B) AND (Byte4=modR/M byte has displacement or sib required)) then Instruction-length calculated based on value of modR/M field (230, FIG. 2) and value of three bits in SIB field (240, FIG. 2).

Accordingly, the length decode block 710 for a new type 1 instruction need not evaluate the third opcode byte to determine the length of the instruction. In this manner, decode logic for a new type 1 instruction is kept relatively simple. For at least one embodiment, no additional bytes are evaluated to determine which length decode logic to use for a new type 1 instruction in comparison to the number of bytes evaluated to determine which length decode logic to use for an extended type 1 instruction.

As is mentioned above, simplicity of the length decode processing 710 for new type 0 and new type 1 instructions is preserved by defining the opcode maps and their corresponding length-determination logic such that a single fixed-input length-determination is used to determine the length of each instruction in a respective opcode map. The length of each instruction in a particular 3-byte opcode map is thus determined by the same method as all other instructions having that 3-byte opcode value. That is, each of the 3-byte opcode values—0x0F38, 0x0F39, 0x0F3A, 0x0F3B—is associated with an opcode map wherein the length each instruction of the opcode map is determined by the same fixed-input method.

For example, for at least one embodiment all instructions associated with the three-byte escape opcode value 0x0F38 (see Table 1, above) are determined by evaluating the same four bytes of the instruction. These four bytes include the two bytes that contain the three-byte escape opcode value (0x0F38), the one-byte opcode field that holds the opcode value (as illustrated in Table 1, above), and the one-byte modR/M field. Depending on the value in the modR/M field, an additional three bits of the SIB field may also be evaluated to determine instruction length of an instruction in the 0x0F38 opcode map. No immediate data is included in any instruction in the 0x0F38 opcode map.

Similarly, for at least one embodiment all instructions associated with the three-byte escape opcode value 0x0F3A (see Table 1, above) are determined by the same method. The method evaluates the two bytes that contain the three-byte escape opcode value (0x0F38), the one-byte opcode field that holds the opcode value (as illustrated in Table 1, above), the one-byte modR/M field, and a one-byte field that holds immediate data. Depending on the value in the modR/M field, an additional three bits of the SIB field may also be evaluated to determine instruction length of an instruction in the 0x0F38 opcode map.

FIG. 7 illustrates that, if it is determined at block 706 that the byte of an instruction following a byte containing the two byte escape opcode value 0x0F does not contain one of the three-byte escape opcode values, then processing proceeds to block 722.

Blocks 714, 716, 718, 719, 720 and blocks 722, 724, 726, 727 and 728 respectively perform similar processing. The former set of blocks is performed if block 704 determines that the instruction does not include the two byte escape opcode value 0x0F. Blocks 722, 724, 726, 727 and 728, on the other hand, are performed if it is determined at block 706 that, although the preceding byte contains the two-byte escape opcode value 0x0F, the current byte does not include a three-byte escape opcode value.

For each case, it is determined at blocks 714 and 722, respectively, whether the current instruction includes a modR/M value. If so, then processing proceeds to blocks 718 and 726, respectively, wherein the modR/M value is obtained. If the modR/M value indicates than an SIB value should be retrieved, the SIB value is retrieved at block 719 and 727, respectively. The length of the instruction is determined at blocks 720 and 728, respectively, utilizing the modR/M value and, if indicated, one or more bits from the SIB field. Processing then ends.

If the current instruction includes a modR/M value, then processing proceeds to blocks 716 and 724, respectively, where the length of the instruction is decoded without taking a modR/M value into account. Processing then ends.

As the foregoing discussion illustrates, embodiments of the apparatus and method described herein provide an efficient mechanism to decode a new instruction set using three-byte escape opcodes along with an existing prefix value. The new instruction set enlarges upon the existing instruction set without unduly complicating the instruction decoder.

The foregoing discussion describes the definition of an opcode map, for a processor having a variable-length instruction set, for which each instruction in the opcode map can be length-decoded using the fixed-input length determination logic. The foregoing description has been discussed in terms of a single method of determining the length of instructions in a 3-byte escape opcode map. However, in an alternative embodiment a one-byte escape opcode map may be defined so that a single fixed-input length-determination logic can be applied to decode the length for each instruction in the opcode map. For such instructions, an instruction-specific opcode follows an escape byte containing a particular value such as, for instance, 0xD6 or 0xF1. The length of each instruction in such one-byte escape opcode map may be decoded using the same fixed-input length-determination logic.

Similarly, in an alternative embodiment all or a portion of a 2-byte escape opcode map may also be defined as described herein. In such embodiment, the same fixed-input length-determination logic may be applied to decode the length of each instruction in the new two-byte escape opcode map. For example, a block of instructions within the two-byte escape opcode map may be defined such that a single fixed-input length-determination logic may be used to determine the length of each instruction in such opcode map. For at least one embodiment, the new escape code maps are defined such that an instruction-specific opcode follows an escape code. The escape code may, for instance, be any or all of the following: 0x0F3C through 0x0F3Y.

While particular embodiments of the present invention have been shown and described, it will be obvious to those skilled in the art that changes and modifications can be made without departing from the present invention in its broader aspects. The appended claims are to encompass within their scope all such changes and modifications that fall within the true scope of the present invention.

What is claimed is:

1. A method comprising:
  determining if an instruction code of a variable-length instruction set having an addressing form field includes an escape opcode value; and
  if the instruction code includes the escape opcode value, determining the length of the instruction code exclusive of evaluating an instruction-specific opcode value in the instruction code.

2. The method of claim 1, further comprising:
  executing an operation responsive to a value in the instruction-specific opcode value in the instruction code.

3. The method of claim 1, wherein determining the length of the instruction code includes evaluating contents of a modR/M field in the instruction code and the escape opcode value.

4. The method of claim 1, wherein determining the length of the instruction code includes evaluating contents of a modR/M field in the instruction code, the escape opcode value, and an optional prefix field in the instruction code.

5. The method of claim 1, further comprising:
  determining if the escape opcode value is one of a plurality of predetermined escape opcode values.

6. The method of claim 5, wherein the plurality of predetermined escape opcode values include 0x0F38, 0x0F39, 0x0F3A and 0x0F3B.

7. A processor system, comprising:
  a memory to store an instruction code of a variable-length instruction set, the instruction code having an instruction-specific opcode, an addressing form field and an escape code, the escape code including a first byte value contiguous with a second byte value, the instruction-specific opcode being contiguous with the escape code;
  an instruction decoder including length-determination logic to receive a set of inputs including the escape code, the length-determination logic to determine a length of the instruction code without needing to evaluate the instruction-specific opcode.

8. The processor system of claim 7 wherein each input in the set of inputs is relevant to determining a length of each of a plurality of different instruction codes, and wherein each of the plurality of different instruction codes include the same escape code values.

9. The processor system of claim 7, wherein the set of inputs includes contents of a modR/M addressing form field.

10. The processor system of claim 9, wherein the set of inputs includes at least part of a Scale/Index/Base (SIB) field.

11. The processor system of claim 7, said instruction decoder further comprising an escape detector to determine if the escape code is one of a plurality of predetermined escape code values.

12. The processor system of claim 11, wherein the plurality of predetermined escape code values include 0x0F38, 0x0F39, 0x0F3A and 0x0F3B.

13. The processor system of claim 7, wherein the memory comprises dynamic random access memory (DRAM).

14. An apparatus comprising:
  means for fetching from memory an instruction code of a variable-length instruction format, the instruction format including an escape field having a plurality of byte elements including a first byte element and a second byte element, the instruction format further including an addressing form field and an instruction-specific opcode field between the escape field and the addressing form field;
  means for determining a length of the instruction code from one or more portions of the instruction code without needing to evaluate the instruction-specific opcode; and
  means for initiating an operation responsive to a value in the instruction-specific opcode.

15. The apparatus of claim 14, wherein the instruction code further optionally includes a prefix field, and determining the length of the instruction code is based completely on the contents of the escape field, the addressing form field, and the optional prefix field.

16. The apparatus of claim 14, wherein the instruction code further optionally includes a base field, and determining the length of the instruction code is based completely on the contents of the escape field, the addressing form field, and the optional base field.

17. The apparatus of claim 14, wherein determining the length of the instruction code is based completely on the contents of the escape field, and the addressing form field.

18. The apparatus of claim 14, further comprising:
  means for determining if the escape code is one of a plurality of predetermined escape code values.

19. The apparatus of claim 18, wherein the plurality of predetermined escape code values include 0x0F38, 0x0F39, 0x0F3A and 0x0F3B.

* * * * *